US007031971B1

(12) United States Patent
Taillefer

(10) Patent No.: US 7,031,971 B1
(45) Date of Patent: Apr. 18, 2006

(54) LOCK-FREE HANDLE RESOLUTION

(75) Inventor: Martin Taillefer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/394,990

(22) Filed: Mar. 21, 2003

(51) Int. Cl.
 *G06F 17/30* (2006.01)
(52) U.S. Cl. .......................... 707/100; 707/2
(58) Field of Classification Search ............... 707/2–5, 707/100
 See application file for complete search history.

(56) References Cited

U.S. PATENT DOCUMENTS

| 5,799,310 | A | * | 8/1998 | Anderson et al. ........... 707/102 |
| 5,802,590 | A | * | 9/1998 | Draves ....................... 711/164 |
| 5,838,965 | A | * | 11/1998 | Kavanagh et al. ...... 707/103 R |
| 6,105,039 | A | | 8/2000 | Douceur et al. |
| 6,178,423 | B1 | * | 1/2001 | Douceur et al. ............... 707/9 |
| 6,185,564 | B1 | * | 2/2001 | Douceur et al. ............... 707/9 |
| 6,711,566 | B1 | * | 3/2004 | Nakano et al. ................. 707/3 |

* cited by examiner

*Primary Examiner*—Greta Robinson
*Assistant Examiner*—Cheryl Lewis
(74) *Attorney, Agent, or Firm*—Lee & Hayes, PLLC

(57) ABSTRACT

Lock-free resource handle resolution is provided by a handle management system that generates a hierarchy of handle mapping tables such that the number of mapping tables and the number of hierarchical levels can each increase dynamically. Resource handles are generated based on index values associated with pointers stored in the handle mapping tables. Handle resolution can be performed without having to lock the tables because changes to the hierarchical structure of handle mapping tables do not affect handle resolution processing for existing resource handles.

60 Claims, 8 Drawing Sheets

LOCK-FREE HANDLE RESOLUTION

TECHNICAL FIELD

This invention relates to resource handles and, in particular, to methods and systems for managing and resolving resource handles such that handle resolution can be performed without locking.

BACKGROUND

Resource handles are a common mechanism used in computer programming to name and reference resources. For example, an application programming interface (API) may use handles to reference resources that are exposed by the API to one or more clients. Resource handles provide a level of indirection between clients and the resources they use, which protects the resources from improper access by the clients.

When an API is invoked and is given a handle, it must resolve the handle in order to locate the actual resource that the handle represents. Typically, a handle is in some way associated with a pointer to a resource. Handle resolution is conceptually similar to locating a book within a library by using the title of the book to look up a unique number associated with the book, and then locating the book on the shelf using the number.

In systems with limited storage and processing capabilities, efficient resource handle management and resolution is especially important. Handles and their associated resolution information must be compact in order to consume minimal system memory, and the handle resolution process must be efficient. It is typical for a resource handle to be created once, and then resolved several times through calls to an API. As such, the performance of the handle resolution process can have a significant impact on the performance of a system as a whole.

Handle resolution information is typically stored in a variable length data structure. Due to the varying nature of such data structures, handle creation, deletion, and resolution processing requires that the data structure be locked. Locking the data structure provides mutually exclusive access to the data structure, which prevents multiple processing threads from attempting to modify the same 6 data structure at the same time, which may lead to corruption of the data structure.

Because handle resolution is performed with greater frequency than handle creation and deletion, it is desirable to be able to perform handle resolution without having to lock the resolution information data structures to ensure mutually exclusive access, as locking the resolution information data structures consumes processing time and can lead to additional latencies, context switching, and multi-thread synchronization overhead.

SUMMARY

A resource handle management technique for providing lock-free handle resolution is described. A hierarchical structure of handle mapping tables is dynamically resized as resource handles are created. A lowest level table, which stores indexed pointers to requested resources, is created first. As additional lowest level tables are added, higher level tables, which store indexed pointers to lower level tables, are added as needed. Resource handles are generated based on indices associated with one or more of the handle mapping tables. Once created, handle mapping tables are not deleted, and handle mapping tables are added to the hierarchical structure in such a way as to not affect concurrent handle resolution processing taking place for existing resource handles. Accordingly, handle resolution can be performed without having to lock the handle mapping tables.

BRIEF DESCRIPTION OF THE DRAWINGS

The same numbers are used throughout the drawings to reference like features and components.

DETAILED DESCRIPTION

The following discussion is directed to methods and systems for managing and resolving resource handles. In the described example implementation, a hierarchical structure of handle mapping tables is created dynamically, based on requests for resource handles. The handle mapping tables are built one at a time, as needed, in a hierarchical fashion, beginning with child tables, and adding parent tables as needed. Handles are structured based on indexed locations associated with the created handle mapping tables. According to the described implementation, handle resolution is performed using the handle mapping tables without the need for table locking.

Exemplary System Architecture

Figure 1:
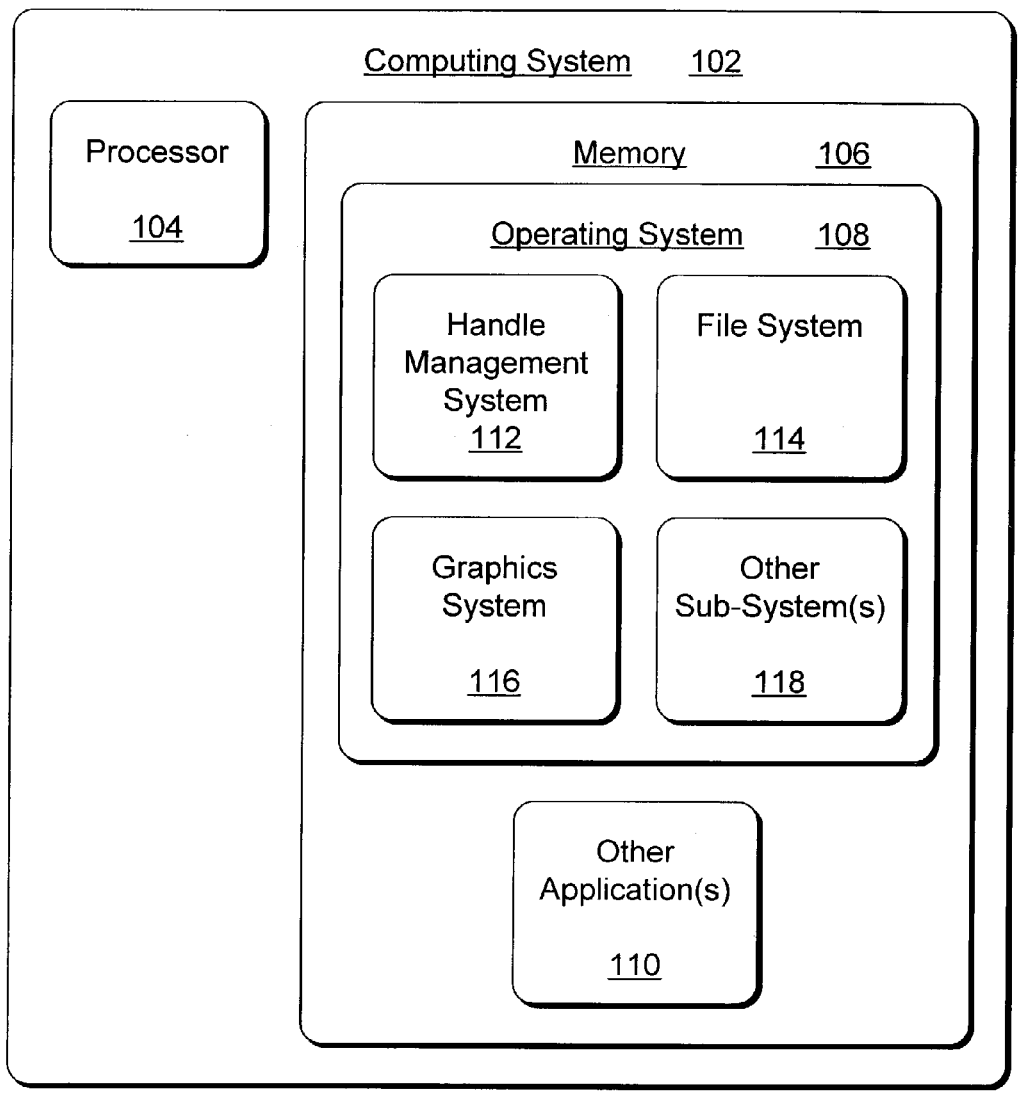
FIG. 1 illustrates select components of an exemplary computer system in which lock-free handle resolution may be implemented.

FIG. 1 illustrates an exemplary computing system 102 that may be used to implement lock-free handle resolution. Computing system 102 includes processor 104 and memory 106. Operating system 108 as well as other applications 110 are stored in memory 106 and executed on processor 104.

Operating system 108 includes handle management system 112, file system 114, graphics system 116, and may also include other subsystems 118, such as a network system. Handle management system 112 performs tasks associated with creating, deleting, and resolving resource handles. Select components of handle management system 112 are described in more detail below with reference to FIG. 2.

Exemplary Handle Management System

Figure 2:
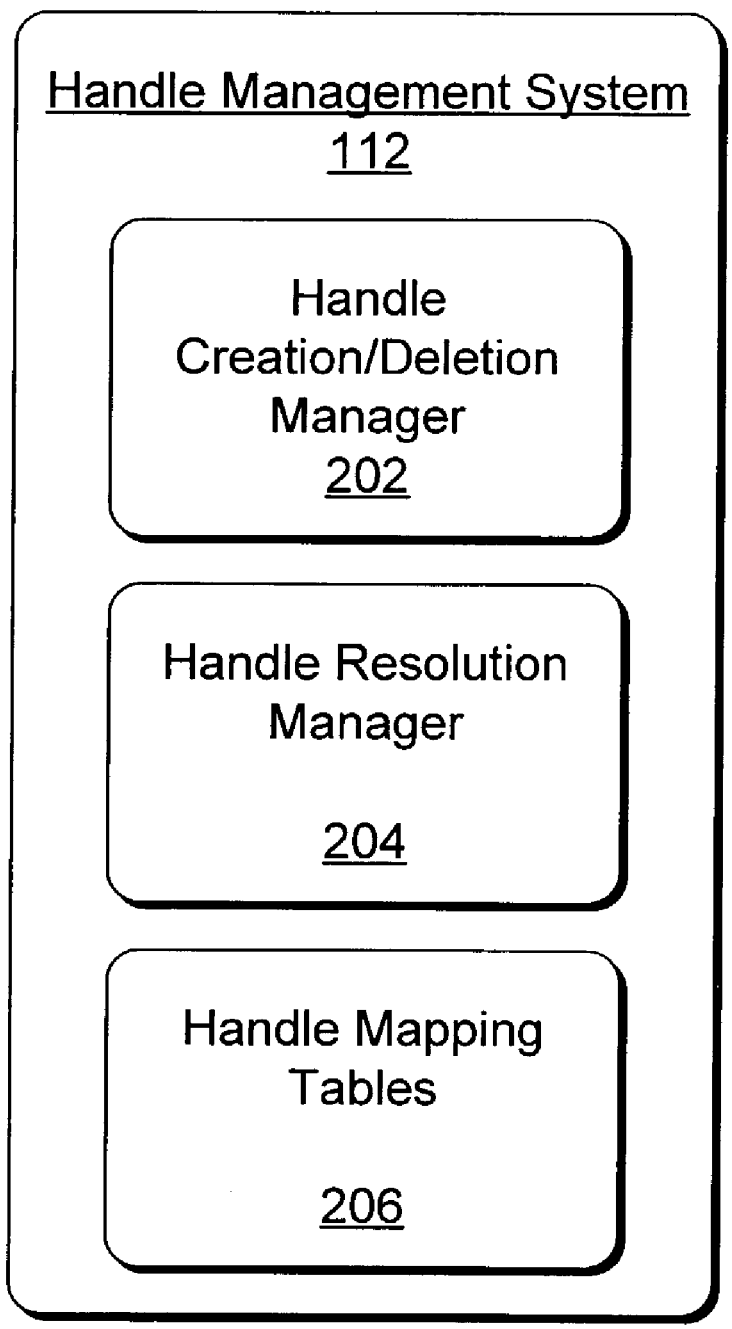
FIG. 2 illustrates select components of an exemplary handle management system as depicted in FIG. 1.

FIG. 2 illustrates select components of exemplary handle management system 112 illustrated in FIG. 1. Handle management system 112 includes handle creation/deletion manager 202, handle resolution manager 204, and handle mapping tables 206.

Handle creation/deletion manager 202 performs handle management tasks in response to receiving requests to create or delete resource handles. In the described implementation, in response to a request to create a resource handle, handle creation/deletion manager 202 may create one or more handle mapping tables 206, store a pointer to a resource associated with the requested handle in handle mapping tables 206, and generate a resource handle to be returned to the requesting application or process. An exemplary handle creation method that may be performed by handle creation/deletion manager 202 is described in more detail below with reference to FIG. 7. In the described implementation, handles are formatted to indicate one or more indexed locations within handle mapping tables 206. An exemplary handle structure is described in more detail below with reference to FIG. 6.

In response to a request to delete a resource handle, handle creation/deletion manager 202 deletes the pointer to the resource associated with the handle from handle mapping tables 206, thus rendering the resource handle invalid.

Handle resolution manager 204 is configured to receive a resource handle, and return a pointer to a resource associated with the received resource handle. Handle resolution manager 204 parses the received handle to identify indices associated with handle mapping tables 206, which are used by handle resolution manager 204 to resolve the handle. An exemplary handle resolution method that may be performed by handle resolution manager 204 is described in more detail below with reference to FIG. 8.

Handle mapping tables 206 are implemented as a dynamic hierarchy of tables. In the described implementation, the hierarchy may include up to three levels. Alternate implementations may be configured to allow more or fewer hierarchical levels while still enabling lock-free handle resolution. The Level 1 tables (also known as child nodes in a hierarchy) are used to store pointers to resources that are associated with resource handles. Level 2 tables (also known as parent nodes to the Level 1 child nodes) are used to store pointers to Level 1 tables. Similarly, Level 3 tables (also known as parent nodes to the Level 2 tables) are used to store pointers to Level 2 tables (which may then also be known as child nodes in relationship to the Level 3 tables). An exemplary structure of a three-level dynamic hierarchy of handle mapping tables 206 is described in more detail below with reference to FIGS. 3–5.

Exemplary Handle Mapping Table Structure

Figure 3:
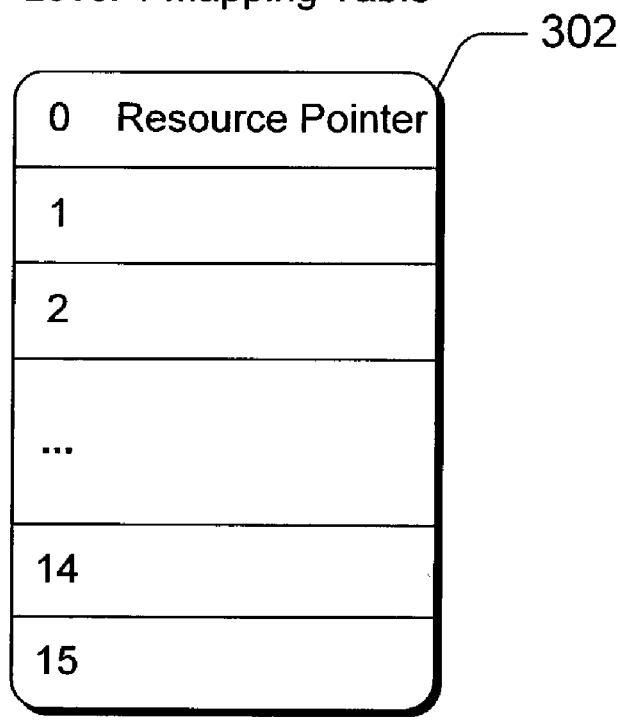
FIG. 3 illustrates a structure of an exemplary Level 1 handle mapping table.
Figure 4:
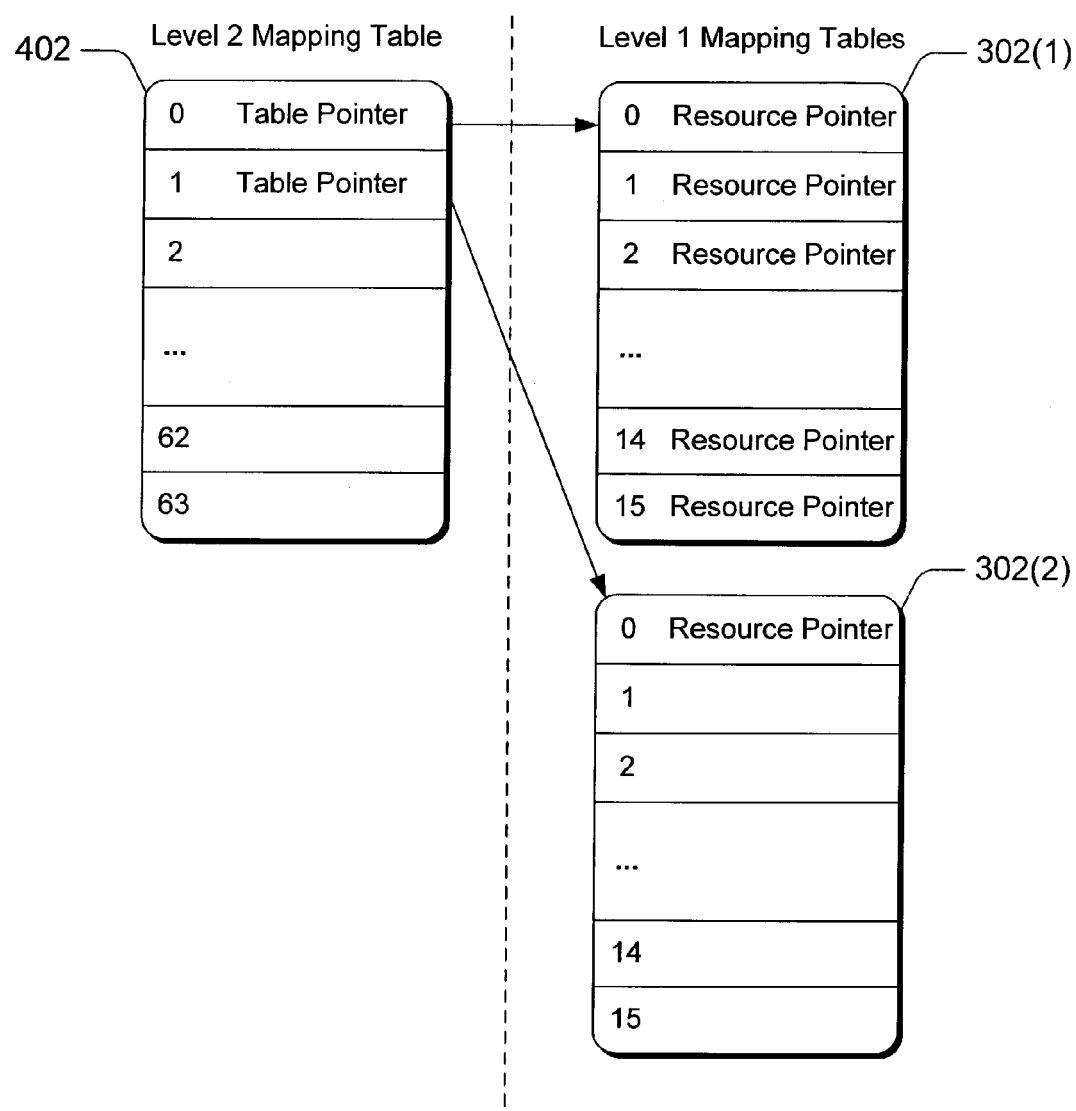
FIG. 4 illustrates a structure of an exemplary two-level hierarchy of handle mapping tables.
Figure 5:
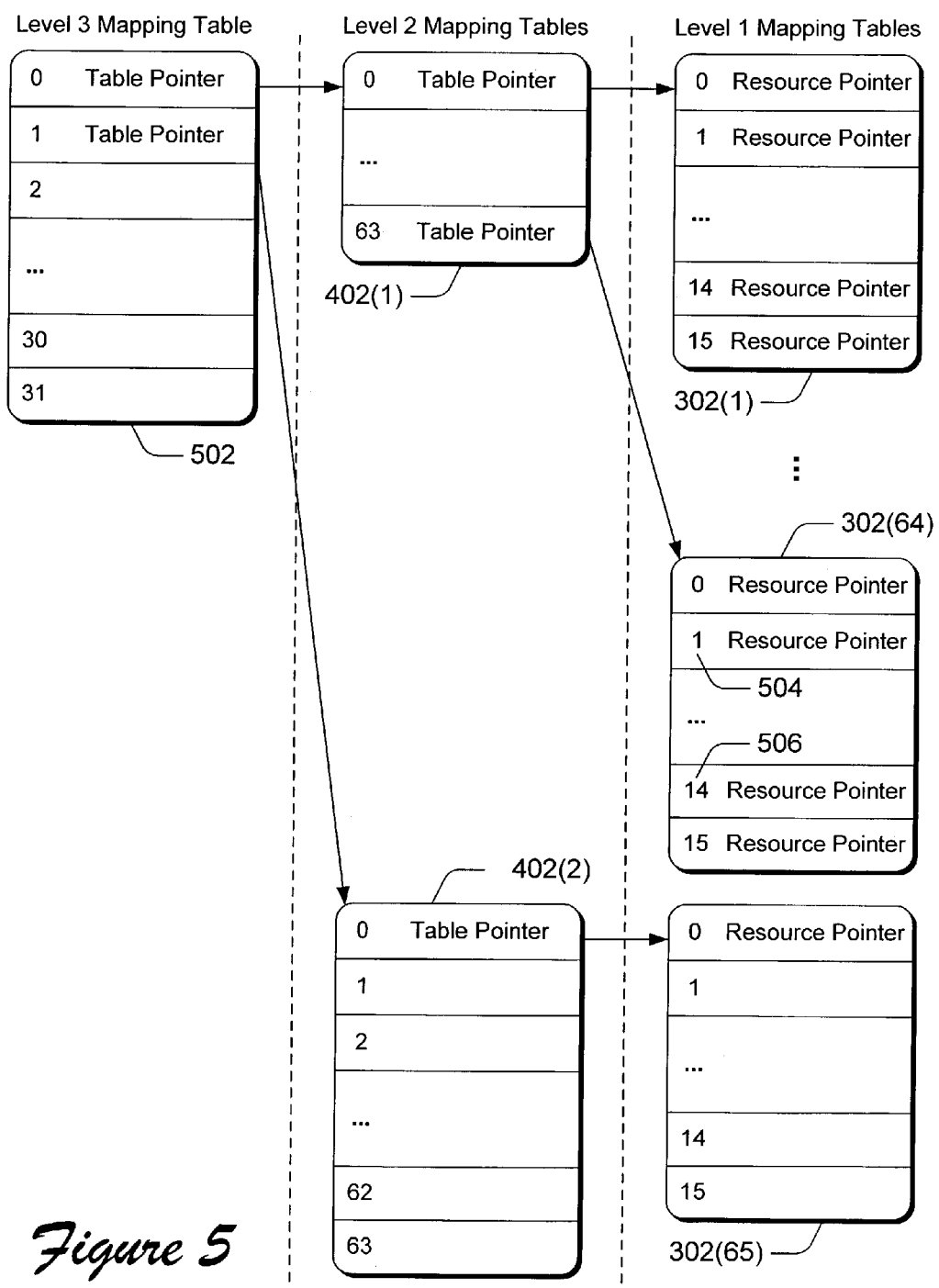
FIG. 5 illustrates a structure of an exemplary three-level hierarchy of handle mapping tables.

FIGS. 3–5 illustrate an exemplary structure for handle mapping tables 206. As described above, in an exemplary implementation, handle mapping tables 206 are implemented according to a dynamic hierarchy that may include up to three levels of table structures. FIG. 3 illustrates an exemplary single level handle mapping table structure; FIG. 4 illustrates an exemplary two-level handle mapping table structure; and FIG. 5 illustrates an exemplary three-level handle mapping table structure.

FIG. 3 illustrates an exemplary structure of a Level 1 handle mapping table 302. As described above, each Level 1 handle mapping table 302 stores pointers to resources associated with resource handles. In the described implementation, each Level 1 handle mapping table 302 is configured to store pointers for up to 16 resource handles (indexed 0–15). Accordingly, a Level 1 table index may be represented by a 4-bit integer.

FIG. 4 illustrates an exemplary two-level hierarchy of handle mapping tables 206. When a handle creation request is received after the first Level 1 handle mapping table 302(1) is filled (i.e., 16 resource handles have been created), a second Level 1 handle mapping table 302(2) is created to store a pointer to the resource associated with the new resource handle. In addition, a Level 2 handle mapping table 402 is created. The first entry in the Level 2 handle mapping table 402 stores a pointer to the first Level 1 handle mapping table 302(1), and the second entry in the Level 2 handle mapping table 402 stores a pointer to the second Level 1 handle mapping table 402(2). (In terms of the hierarchy, the Level 2 handle mapping table is now the parent table to the Level 1 handle mapping tables.)

As additional resource handles are created, additional Level 1 tables are added with pointers to the Level 1 tables being stored in Level 2 handle mapping table 402. In the described implementation, each Level 2 handle mapping table is configured to store pointers for up to 64 Level 1 handle mapping tables (indexed 0–63). Accordingly, a Level 2 table index may be represented by a 6-bit integer.

FIG. 5 illustrates an exemplary three-level hierarchy of handle mapping tables 206. When a handle creation request is received after the first Level 2 handle mapping table 402(1) is filled (i.e., 64 Level 1 handle mapping tables have been filled), a new Level 1 handle mapping table 302(65), a second Level 2 handle mapping table 402(2), and a Level 3 handle mapping table 502 are created. The first entry in Level 1 handle mapping table 302(65) stores a pointer to the resource associated with the new handle resource, and the first entry in Level 2 handle mapping table 402(2) stores a pointer to the new Level 1 handle mapping table 302(65). Level 3 handle mapping table 502 stores a pointer to the first Level 2 handle mapping table 402(1) and a pointer to the second Level 2 handle mapping table 402(2). (In terms of the hierarchy, the Level 3 handle mapping table is now the parent table to the Level 2 handle mapping tables.) In the described implementation, Level 3 handle mapping table 502 is configured to store pointers for up to 32 Level 2 handle mapping tables (indexed 0–31). Accordingly, a Level 3 table index may be represented by a 5-bit integer.

The number of indexed values that may be stored in each Level 1, Level 2, or Level 3 handle mapping table may be different in alternate implementations. Furthermore, alternate implementations may support more or fewer than three levels of handle mapping tables.

In the described implementation, when a request to delete a resource handle is received, the resource pointer associated with the handle is deleted from the appropriate Level 1 mapping table. The space made available when a resource pointer is deleted is re-used when a subsequent resource handle is requested. To enable lock-free handle resolution, handle mapping tables 206 are not deleted, even if all of the resource handles whose pointers are stored in a particular table are deleted. Because the handle resolution process does not require an exclusive lock on the handle mapping tables, it is possible that any number of processing threads may be accessing the handle mapping tables at any given time. If an existing handle mapping table were deleted, an existing handle resolution thread may be negatively impacted.

Exemplary Handle Structure

Figure 6:
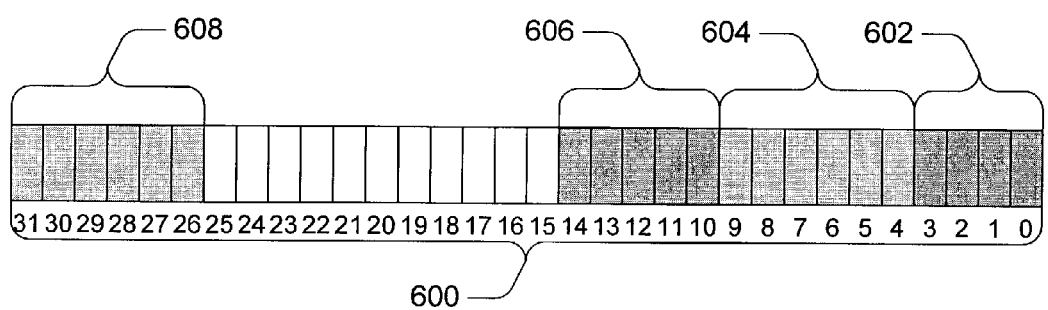
FIG. 6 illustrates a structure of an exemplary resource handle.

FIG. 6 illustrates a structure of an exemplary resource handle 600. In the described implementation, each resource handle is represented as a 32-bit integer that includes three handle mapping table indices 602, 604, and 606. When a handle is created, the bits that make up a Level 1 handle mapping table index 602 (e.g., bits 0–3) are set to a value that represents the index of the Level 1 handle mapping table in which the pointer to the resource associated with the handle is stored. For example, bits 0–3 of a handle whose pointer is stored at index 1 of a Level 1 handle mapping table 504 will have the value "0001", while bits 0–3 of a handle whose pointer is stored at index 14 of a Level 1 handle mapping table will have the value "1110".

When a handle is created, the bits that make up a Level 2 handle mapping table index 604 (e.g., bits 4–9) are set to a value that represents the index of the Level 2 handle mapping table that points to the Level 1 handle mapping table in which the pointer to the resource associated with the handle is stored. If, when the handle is created, there is no Level 2 handle mapping table, then the bits of the Level 2 handle mapping table index 604 are all set to 0. Because of the way handle mapping tables are created such that the first entry in a Level 2 table points to the first created Level 1 table, a Level 2 handle mapping table index 604 of 0 is assured to be accurate even after a Level 2 handle mapping table is created.

Similarly, when a handle is created, the bits that make up a Level 3 handle mapping table index 606 (e.g., bits 10–14) are set to a value that represents the index of the Level 3 handle mapping table that points to the Level 2 handle mapping table that includes an indexed pointer to the Level 1 handle mapping table in which the pointer to the resource associated with the handle is stored. If, when the handle is created, there is no Level 3 handle mapping table, then the bits of the Level 3 handle mapping table index 606 are all set to 0.

In alternate implementations, the size of each Level 1, Level 2, and Level 3 mapping table may differ from the described implementation. The number of bits in each resource handle that correspond to the Level 1, Level 2, and Level 3 handle mapping table indices may also differ accordingly.

In an alternate implementation, handle 600 also includes one or more bits (e.g., bits 26–31) that are designated as a handle set indicator. A handle set indicator may be used to identify a particular group of handle mapping tables associated, for example, with an operating system sub-system. For example, resource handles associated with file system 114 may all be associated with the same handle set identifier and may be managed using one dynamic three-level hierarchy of handle mapping tables 206. Similarly, resource handles associated with graphics system 116 may all be associated with another handle set identifier and may be managed using another dynamic three-level hierarchy of handle mapping tables 206.

The number of bits that are designated as a handle set identifier may vary in alternate implementations, depending on the number of handle sets to be supported. For example, two bits may be used to designate up to four handle sets, while three bits may be used to designate up to eight handle sets. In an exemplary implementation, bits 26–31 are used, supporting up to 64 handle sets.

Exemplary Handle Management Methods

Resource handle management may be described in the general context of computer-executable instructions, such as application modules, being executed by a computer. Generally, application modules include routines, programs, objects, components, data structures, etc. that perform particular tasks or implement particular abstract data types. Handle management system 112 may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Exemplary Handle Creation Method

Figure 7:
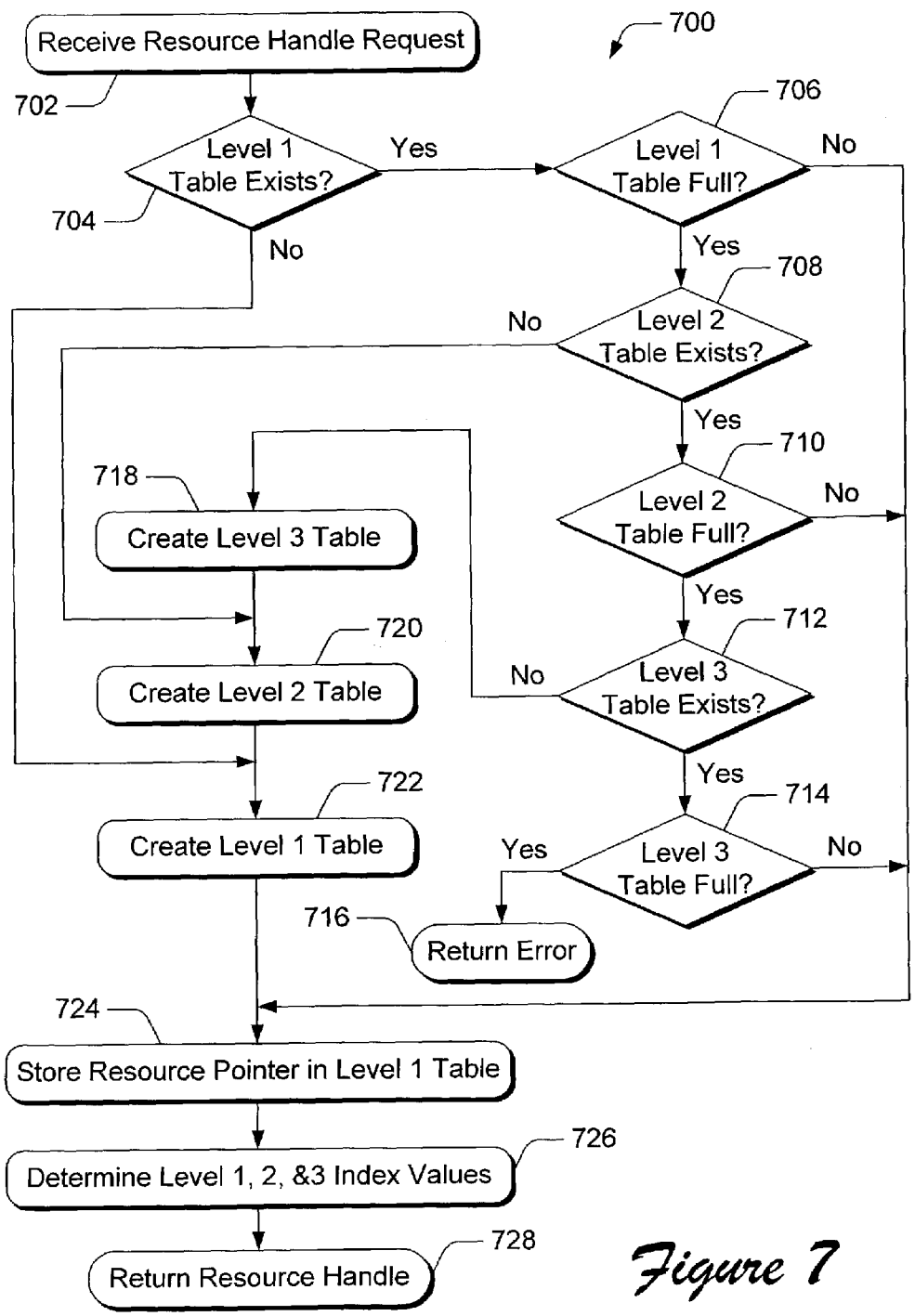
FIG. 7 illustrates an exemplary method that may be performed by the handle creation/deletion manager of FIG. 2.

FIG. 7 illustrates an exemplary method 700 that may be performed by handle creation/deletion manager 202 to create a resource handle.

At block 702, handle creation/deletion manager 202 receives a request for a resource handle.

At block 704, handle creation/deletion manager 202 determines whether or not a Level 1 handle mapping table exists. If it is determined that a Level 1 handle mapping table does not exist (indicating that there are no resource handles currently being managed), then a new Level 1 handle mapping table is created at block 722 (the "No" branch from block 704), which is described in more detail below.

On the other hand, if it is determined that a Level 1 handle mapping table does exist (the "Yes" branch from block 704), the handle creation/deletion manager 202 determines whether or not all of the existing Level 1 handle mapping tables are full (block 706). If there is at least one Level 1 handle mapping table that is not full (the "No" branch from block 706), a pointer to the requested resource is stored in a Level 1 handle mapping table at block 724, described in more detail below.

On the other hand, if it is determined that all existing Level 1 handle mapping tables are full (the "Yes" branch from block 706), then handle creation/deletion manager 202 determines whether or not a Level 2 handle mapping table exists (block 708). If it is determined that a Level 2 handle mapping table does not exist (the "No" branch from block 708), then a Level 2 handle mapping table is created at block 720, described below.

On the other hand, if it is determined that a Level 2 handle mapping table does exist (the "Yes" branch from block 708), then at block 710, handle creation/deletion manager 202 determines whether or not all of the existing Level 2 handle mapping tables are full. If there is at least one Level 2 handle mapping table that is not full (the "No" branch from block 710), then a pointer to the requested resource is stored in a Level 1 handle mapping table at block 724, described in more detail below. On the other hand, if it is determined that all existing Level 2 handle mapping tables are full (the "Yes" branch from block 710), then at block 712, handle creation/deletion manager 202 determines whether or not a Level 3 handle mapping table exists. If it is determined that a Level 3 handle mapping table does not exist (the "No" branch from block 712), then a new Level 3 handle mapping table is created at block 718.

On the other hand, if it is determined that a Level 3 handle mapping table does exist (the "Yes" branch from block 712), then at block 714, handle creation/deletion manager 202 determines whether or not the existing Level 3 handle mapping table is full. If the Level 3 handle mapping table is not full (the "No" branch from block 714), then a pointer to the requested resource is stored in a Level 1 handle mapping table at block 724.

On the other hand, if it is determined that the existing Level 3 handle mapping table is full (the "Yes" branch from block 714), then at block 716 an error value is returned indicating that there is no space available to create the requested resource handle, and processing stops.

At block 718, handle creation/deletion manager 202 creates a new Level 3 handle mapping table. A pointer to the first Level 2 mapping table is stored in the newly created Level 3 handle mapping table at index 0. (Because of the order in which handle mapping tables are created, there is guaranteed to be one and only one Level 2 handle mapping table when a Level 3 handle mapping table is created.)

At block 720, handle creation/deletion manager 202 creates a new Level 2 handle mapping table. If this is the first Level 2 handle mapping table, then a pointer to the first Level 1 mapping table is stored in the newly created Level 2 handle mapping table at index 0. (Because of the order in which handle mapping tables are created, there is guaranteed to be one and only one Level 1 handle mapping table when the first Level 2 handle mapping table is created.) If this is not the first Level 2 handle mapping table, then a pointer to the newly created Level 2 handle mapping table is stored at the next available index in the Level 3 handle mapping table.

At block 722, handle creation/deletion manager 202 creates a new Level 1 handle mapping table. If this is not the first Level 1 handle mapping table, then a pointer to the newly created Level 1 handle mapping table is stored in the next available index in a Level 2 handle mapping table.

At block 724, handle creation/deletion manager 202 stores a pointer to the requested resource in the first available index in a Level 1 handle mapping table.

At block 726, handle creation/deletion manager 202 determines a Level 1 index value, a Level 2 index value, and a Level 3 index value. The Level 1 index value is the index of the resource pointer within the Level 1 handle mapping table, as described above with reference to block 724.

If one or more Level 2 handle mapping tables exist, then the Level 2 index value is the index of the Level 2 handle mapping table that stores a pointer to the Level 1 handle mapping table in which the resource pointer is stored. On the other hand, if no Level 2 handle mapping tables exist, then the Level 2 index value is set to zero.

If a Level 3 handle mapping table exists, then the Level 3 index value is the index of the Level 3 handle mapping table that stores a pointer to the Level 2 handle mapping table that stores a pointer to the Level 1 handle mapping table in which the resource pointer is stored. On the other hand, if no Level 3 handle mapping table exists, then the Level 3 index value is set to zero.

At block 728, handle creation/deletion manager 202 returns a 32-bit resource handle to the requesting application or process. The handle is formatted to include the Level 1, Level 2, and Level 3 index values, as described above with reference to FIG. 6. In an alternate implementation, the resource handle may also be formatted to indicate a handle set, which is also described above with reference to FIG. 6. Furthermore, although illustrated and described as a 32-bit value, in alternate implementations, the resource handle may have a different size, for example, 16 or 64 bits. As such, the number of hierarchical levels that are supported as well as the number of values stored in each of the handle mapping tables on each level may also differ.

Because the hierarchical structure of the handle mapping tables may change with the creation of a new resource handle, handle mapping tables 206 are locked during the handle creation processing described above with reference to FIG. 7, to ensure mutually exclusive access to the tables.

Exemplary Handle Resolution Method

When handle management system 112 receives a resource handle, handle resolution manager 204 uses handle mapping table 206 to locate a pointer associated with the received resource handle. The handle management system 112 then returns a pointer to the resource to the application or process from which it received the resource handle.

Figure 8:
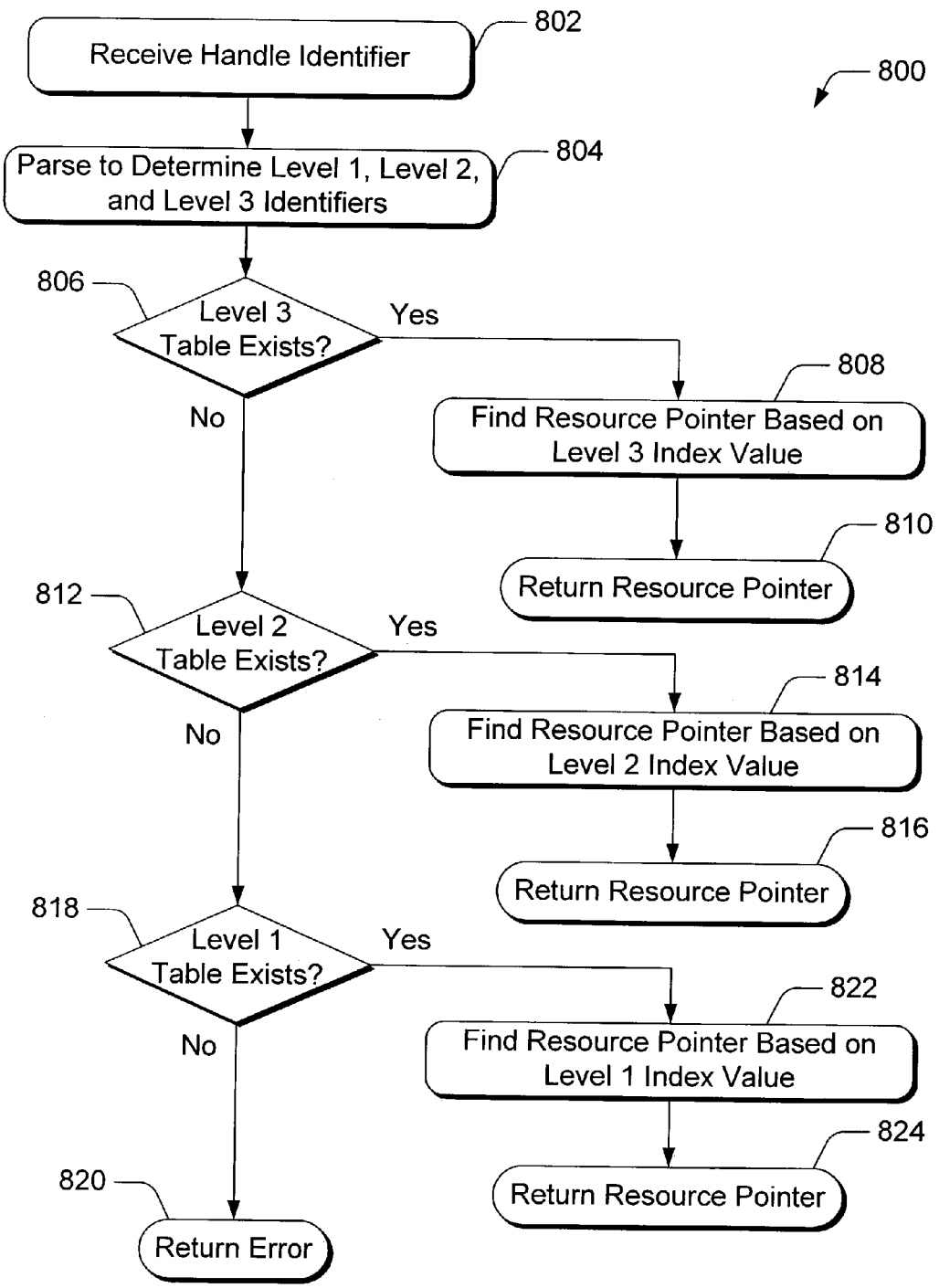
FIG. 8 illustrates an exemplary method that may be performed by the handle resolution manager of FIG. 2.

FIG. 8 illustrates an exemplary method 800 that may be performed by handle resolution manager 204 to resolve a resource handle.

At block 802, handle resolution manager 204 receives a resource handle.

At block 804, handle resolution manager 204 parses the received resource handle to determine the associated Level 1, Level 2, and Level 3 index values. In the described implementation, the Level 1 index value is based on the values of bits 0–3; the Level 2 index value is based on the values of bits 4–9; and the Level 3 index value is based on the values of bits 10–14. In an alternate implementation, handle resolution manager 204 also parses the received resource handle to determine the handle set identifier (e.g., based on the values of bits 26–31), which is then used to determine which set of handle mapping tables 206 is associated with the received handle. As described above, in alternate implementations, the number of bits associated with each index value or with a handle set identifier may differ from those in the described implementation.

At block 806, handle resolution manager 204 determines whether or not a Level 3 handle mapping table exists. If a Level 3 handle mapping table does not exist (the "No" branch from block 806), then handle resolution manager 204 determines whether or not a Level 2 handle mapping table exists, as described in more detail below with reference to block 812.

On the other hand, if a Level 3 handle mapping table does exist (the "Yes" branch from block 806), then at block 808, handle resolution manager 204 finds a pointer to a resource based on the Level 3 index value (which was identified as described above with reference to block 804). Handle resolution manager 204 locates the position in the Level 3 handle mapping table that corresponds to the Level 3 index value. That position holds a pointer to a Level 2 handle mapping table. Handle resolution manager 204 then locates the position in the identified Level 2 handle mapping table that corresponds to the Level 2 index value. That position holds a pointer to a Level 1 handle mapping table. Handle resolution manager 204 then locates the position in the identified Level 1 handle mapping table that corresponds to the Level 1 index value. That position holds a pointer to a resource.

At block 810, handle resolution manager 204 returns the identified resource pointer to the requesting application or process.

At block 812 (if it is determined at block 806 that a Level 3 handle mapping table does not exist), handle resolution manager 204 determines whether or not a Level 2 handle mapping table exists. If a Level 2 handle mapping table does not exist (the "No" branch from block 812), then handle resolution manager 204 determines whether or not a Level 1 handle mapping table exists, as described in more detail below with reference to block 818.

On the other hand, if a Level 2 handle mapping table does exist (the "Yes" branch from block 812), then at block 814, handle resolution manager 204 finds a pointer to a resource based on the Level 2 index value (which was identified as described above with reference to block 804). Handle resolution manager 204 locates the position in the Level 2 handle mapping table that corresponds to the Level 2 index value. That position holds a pointer to a Level 1 handle mapping table. Handle resolution manager 204 then locates the position in the identified Level 1 handle mapping table that corresponds to the Level 1 index value. That position holds a pointer to a resource.

At block 816, handle resolution manager 204 returns the identified resource pointer to the requesting application or process.

At block 818 (if it is determined at block 812 that a Level 2 handle mapping table does not exist), handle resolution manager 204 determines whether or not a Level 1 handle mapping table exists. If a Level 1 handle mapping table does not exist (the "No" branch from block 818), then at block 820, handle resolution manager 204 returns an error, indicating that no resource handles are currently being managed.

On the other hand, if a Level 1 handle mapping table does exist (the "Yes" branch from block 818), then at block 822, handle resolution manager 204 finds a pointer to a resource based on the Level 1 index value (which was identified as described above with reference to block 804). Handle resolution manager 204 locates the position in the Level 1 handle mapping table that corresponds to the Level 1 index value. That position holds a pointer to a resource.

At block 824, handle resolution manager 204 returns the identified resource pointer to the requesting application or process.

Because individual handle mapping tables are not deleted after they are created, and because initial Level 2 and Level 3 index values are predetermined to be zero, even before the first Level 2 or Level 3 mapping table is created, mutually exclusive access to handle mapping tables 206 is not required during the handle resolution processing described above with reference to FIG. 8. Accordingly, FIG. 8 illustrates a method for performing lock-free handle resolution, which results in decreased processing time, and thus increased system performance.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer implemented method comprising:
receiving requests for resource handles;
dynamically generating a hierarchical structure of handle mapping tables such that the number of levels in the hierarchical structure of handle mapping tables dynamically increases as requests for resource handles are received and such that handle mapping tables in a lowest level of the hierarchical structure of handle mapping tables store resource pointers to resources while handle mapping tables in higher levels of the hierarchical structure of handle mapping tables store table pointers to handle mapping tables in lower levels of the hierarchical structure of handle mapping tables; and
generating a resource handle based on index values associated with locations in handle mapping tables at multiple levels of the hierarchical structure of handle mapping tables.

2. The method as recited in claim 1 wherein:
a first of the index values is associated with a location in a handle mapping table at the lowest level of the hierarchical structure of handle mapping tables; and
a second of the index values is associated with a location in a handle mapping table at a second level of the hierarchical structure of handle mapping tables.

3. The method as recited in claim 1 wherein:
a first of the index values is associated with a location in a handle mapping table at the lowest level of the hierarchical structure of handle mapping tables; and
a second of the index values is associated with a default location to be created in a handle mapping table at a second level of the hierarchical structure of handle mapping tables, wherein the second level of the hierarchical structure of handle mapping tables does not yet exist.

4. A computer implemented method comprising:
receiving a first request for a resource handle;
generating a first level-one handle mapping table for storing a predetermined number of indexed resource pointers to resources associated with resource handles;
storing an indexed resource pointer to a resource associated with the first request in the first level-one handle mapping table;
receiving a second request for a resource handle that exceeds the predetermined number of indexed resource pointers;
generating a first level-two handle mapping table for storing table pointers to a predetermined number of level-one handle mapping tables;
storing a table pointer to the first level-one handle mapping table in a first indexed location associated with the first level-two handle mapping table;
generating a second level-one handle mapping table for storing the predetermined number of indexed resource pointers;
storing a table pointer to the second level-one handle mapping table in a second indexed location associated with the first level-two handle mapping table; and
storing an indexed resource pointer to a resource associated with the second request in the second level-one handle mapping table.

5. The method as recited in claim 4 further comprising:
receiving a third request for a resource handle;
determining that the predetermined number of indexed resource pointers are stored in the first level-one handle mapping table;
determining that the predetermined number of indexed resource pointers are stored in the second level-one handle mapping table;
generating a third level-one handle mapping table for storing the predetermined number of indexed resource pointers;
storing a table pointer to the third level-one handle mapping table in a third indexed location associated with the first level-two handle mapping table; and
storing an indexed resource pointer to a resource associated with the third request in the third level-one handle mapping table.

6. The method as recited in claim 4 further comprising:
receiving a third request for a resource handle;
determining whether the predetermined number of indexed resource pointers are stored in the first level-one handle mapping table; and
in an event that the predetermined number of indexed resource pointers are not stored in the first level-one handle mapping table, storing an indexed resource pointer to a resource associated with the third request in the first level-one handle mapping table.

7. The method as recited in claim 6 further comprising:
in an event that the predetermined number of indexed resource pointers are stored in the first level-one handle mapping table, determining whether the predetermined number of indexed resource pointers are stored in the second level-one handle mapping table; and
in an event that the predetermined number of indexed resource pointers are not stored in the second level-one handle mapping table, storing an indexed resource pointer to a resource associated with the third request in the second level-one handle mapping table.

8. The method as recited in claim 4 further comprising:
receiving a third request for a resource handle;
determining that the predetermined number of indexed resource pointers are stored in each of a plurality of level-one handle mapping tables;
determining that the predetermined number of indexed table pointers to level-one handle mapping tables are stored in the first level-two handle mapping table;
generating a first level-three handle mapping table for storing a predetermined number of indexed table pointers to level-two handle mapping tables;
storing a table pointer to the first level-two handle mapping table in a first indexed location associated with the first level-three handle mapping table;
generating a second level-two handle mapping table for storing the predetermined number of indexed table pointers to level-one handle mapping tables;
storing a table pointer to the second level-two handle mapping table in a second indexed location associated with the first level-three handle mapping table;
generating an other level-one handle mapping table for storing the predetermined number of indexed resource pointers;
storing a table pointer to the other level-one handle mapping table in a first indexed location associated with the second level-two handle mapping table; and
storing an indexed resource pointer to a resource associated with the third request in the other level-one handle mapping table.

9. A computer implemented method comprising:
receiving a first request for a resource handle;
generating a first handle mapping table for storing a predetermined number of indexed resource pointers to resources associated with resource handles;
storing an indexed resource pointer to a resource associated with the first request in the first handle mapping table;
receiving a second request for a resource handle; and
in an event that the first handle mapping table is full, generating second and third handle mapping tables wherein the second handle mapping table stores an indexed resource pointer to a resource associated with the second request and wherein the third handle mapping table stores table pointers to the first and second handle mapping tables.

10. A method as recited in claim 9 further comprising:
receiving a third request for a resource handle; and
in an event that the first and second handle mapping tables are full, generating a fourth handle mapping table wherein the fourth handle mapping table stores an indexed resource pointer to a resource associated with the third request and wherein the third handle mapping table stores a table pointer to the fourth handle mapping table.

11. A method as recited in claim 9 further comprising:
receiving a third request for a resource handle; and
in an event that the first, second, and third handle mapping tables are full, generating fourth, fifth, and sixth handle mapping table wherein the fourth handle mapping table stores an indexed resource pointer to a resource associated with the third request, wherein the fifth handle mapping table stores an indexed table pointer to the fourth handle mapping table, and wherein the sixth handle mapping table stores indexed table pointers to the third and fifth handle mapping tables.

12. A computer implemented method comprising:
receiving a request for a resource handle;
identifying a first handle mapping table at a highest level in a hierarchy of handle mapping tables;
determining whether the first handle mapping table is full;
in an event that the first handle mapping table is full, generating a parent handle mapping table;
storing a table pointer to the first handle mapping table in the parent handle mapping table, such that the parent table represents a new highest level in the hierarchy of handle mapping tables;
creating a new handle mapping table at each level of the hierarchy below the parent handle mapping table;
storing a table pointer to each new handle mapping table in a handle mapping table that is one level above the new handle mapping table in the hierarchy;
and storing a resource pointer to a resource associated with the request in a handle mapping table at a lowest level in the hierarchy of handle mapping tables.

13. The method as recited in claim 12 wherein the hierarchy is limited to three levels.

14. The method as recited in claim 12 wherein a handle mapping table associated with a first level of the hierarchy can store up to 16 resource pointers.

15. The method as recited in claim 12 wherein a handle mapping table associated with a second level of the hierarchy can store up to 64 table pointers to handle mapping tables in a first level of the hierarchy.

16. The method as recited in claim 12 wherein a handle mapping table associated with a third level of the hierarchy can store up to 32 table pointers to handle mapping tables in a second level of the hierarchy.

17. The method as recited in claim 12 further comprising:
determining index values associated with each potential level of the hierarchy of handle mapping tables such that in an event that no handle mapping tables exist in association with a particular potential level of the hierarchy of handle mapping tables, setting an index value associated with the particular potential level equal to a default value that will remain valid after a handle mapping table is created in association with the particular potential level of the hierarchy of handle mapping tables; and
generating a resource handle based on the index values.

18. The method as recited in claim 17 further comprising:
generating the resource handle based on a handle set identifier associated with the hierarchy of handle mapping tables.

19. The method as recited in claim 12 further comprising:
generating a resource handle based on index values associated with handle mapping tables from one or more levels of the hierarchy of handle mapping tables.

20. The method as recited in claim 19 wherein a number of index values is equal to a maximum number of levels in the hierarchy of handle mapping tables.

21. The method as recited in claim 19 wherein a first index value corresponds to a location in a handle mapping table associated with a lowest level in the hierarchy of handle mapping tables.

22. The method as recited in claim 19 wherein:
a first index value corresponds to a location in a handle mapping table associated with a first level in the hierarchy of handle mapping tables; and
a second index value corresponds to a location in a handle mapping table associated with a second level in the hierarchy of handle mapping tables.

23. The method as recited in claim 19 wherein the resource handle comprises multiple handle mapping table indices.

24. The method as recited in claim 19 wherein the resource handle comprises:
a level 1 handle mapping table index;
a level 2 handle mapping table index; and
a level 3 handle mapping table index.

25. The method as recited in claim 24 wherein:
the level 1 handle mapping table index corresponds to a location in a handle mapping table associated with a first level of the hierarchy of handle mapping tables;
the level 2 handle mapping table index corresponds to a location in a handle mapping table associated with a second level of the hierarchy of handle mapping tables; and
the level 3 handle mapping table index corresponds to a location in a handle mapping table associated with a third level of the hierarchy of handle mapping tables.

26. The method as recited in claim 24 wherein the resource handle is a 32-bit integer and wherein:
the level 1 handle mapping table index comprises bits 0–3;
the level 2 handle mapping table index comprises bits 4–9; and
the level 3 handle mapping table index comprises bits 10–14.

27. A computer implemented method comprising:
maintaining a first hierarchical structure of handle mapping tables for storing resource handle information associated with a first system;
maintaining a second hierarchical structure of handle mapping tables for storing resource handle information associated with a second system;
associating a first handle set identifier with the first hierarchical structure of handle mapping tables;
associating a second handle set identifier with the second hierarchical structure of handle mapping tables; and
creating a resource handle associated with the first system based, at least in part, on the first handle set identifier.

28. The method as recited in claim 27 wherein the first system is a file system.

29. The method as recited in claim 27 wherein the first system is a graphics system.

30. The method as recited in claim 27 wherein the first system is a network system.

31. The method as recited in claim 27 wherein the resource handle comprises a 32-bit integer and creating the resource handle comprises:
setting values of bits 26–31 based on the first handle set identifier.

32. A computer implemented method comprising:
receiving a resource handle;
identifying one or more index values associated with the resource handle; and
locating a resource pointer associated with the resource handle by using the one or more index values to navigate a hierarchical structure of handle mapping tables without requiring mutually exclusive access to the handle mapping tables.

33. The method as recited in claim 32 wherein a first of the index values corresponds to an indexed location in a level-one handle mapping table for storing resource pointers.

34. The method as recited in claim 33 wherein a second of the index values corresponds to an indexed location in a level-two handle mapping table that stores a table pointer to the level-one handle mapping table.

35. The method as recited in claim 32 wherein the resource handle is a 32-bit integer and the identifying comprises:
determining a first index value based on values of bits 0–3 of the resource handle;
determining a second index value based on values of bits 4–9 of the resource handle; and
determining a third index value based on values of bits 10–14 of the resource handle.

36. The method as recited in claim 35 wherein the locating comprises:
determining that a third level of the hierarchical structure of handle mapping tables does not exist;
determining that a second level of the hierarchical structure of handle mapping tables does not exist;
identifying an indexed location in a handle mapping table based on the first index value; and
identifying a resource pointer stored at the indexed location.

37. The method as recited in claim 35 wherein the locating comprises:
determining that a third level of the hierarchical structure of handle mapping tables does not exist;
identifying a first indexed location in a first handle mapping table associated with a second level of the hierarchical structure of handle mapping tables based on the second index value;
identifying a table pointer stored at the first indexed location, the table pointer identifying a second handle mapping table associated with a first level of the hierarchical structure of handle mapping tables;
identifying a second indexed location in the second handle mapping table based on the first index value; and
identifying a resource pointer stored at the second indexed location.

38. The method as recited in claim 35 wherein the locating comprises:
identifying in a first handle mapping table, a table pointer to a second handle mapping table based on the third index value;
identifying in the second handle mapping table, a table pointer to a third handle mapping table based on the second index value; and
identifying in the third handle mapping table, a resource pointer to a resource associated with the resource handle based on the first index value.

39. The method as recited in claim 38 wherein:
the first handle mapping table is associated with a third level of the hierarchical structure of handle mapping tables;
the second handle mapping table is associated with a second level of the hierarchical structure of handle mapping tables; and
the third handle mapping table is associated with a first level of the hierarchical structure of handle mapping tables.

40. The method as recited in claim 32 further comprising:
determining a handle set identifier associated with the resource handle; and
selecting one of multiple hierarchical structures of handle mapping tables based on the handle set identifier.

41. A computer implemented system comprising:
a processor;
a memory;

an operating system;

a handle management system configured to manage resource handles according to a hierarchical structure of handle mapping tables; and a handle creation manager configured to create resource handles by storing resource pointers in indexed locations of handle mapping tables associated with a lowest level of the hierarchical structure of handle mapping tables wherein a handle mapping table associated with a higher level of the hierarchical structure of handle mapping tables stores table pointers to the handle mapping tables associated with the lowest level of the hierarchical structure of handle mapping tables.

42. The system as recited in claim 41, wherein the handle management system comprises:

a handle creation manager configured to create resource handles by storing resource pointers in indexed locations of handle mapping tables associated with a lowest level of the hierarchical structure of handle mapping tables wherein a handle mapping table associated with a higher level of the hierarchical structure of handle mapping tables stores table pointers to the handle mapping tables associated with the lowest level of the hierarchical structure of handle mapping tables.

43. The system as recited in claim 41, wherein the handle management system comprises:

a handle deletion manager configured to delete a resource handle by deleting a resource pointer from an indexed location of a handle mapping table associated with the lowest level of the hierarchical structure of handle mapping tables.

44. The system as recited in claim 41, wherein the handle management system comprises:

a handle resolution manager configured to resolve a received resource handle by locating a resource pointer stored in an indexed location of a handle mapping table associated with a lowest level of the hierarchical structure of handle mapping tables based on one or more index values associated with the resource handle, while not requiring exclusive access to the handle mapping tables.

45. A computer implemented system comprising:
a hierarchical structure of handle mapping tables; and
a handle creation manager configured to:
create a resource handle by storing a resource pointer to a resource associated with the resource handle in a location of a handle mapping table in the hierarchical structure of handle mapping tables; and
generate the resource handle based on an index associated with the location.

46. The system as recited in claim 45, wherein the handle creation manager is further configured to create one or more handle mapping tables according to the hierarchical structure of handle mapping tables in response to receiving a request for a resource handle.

47. The system as recited in claim 45 further comprising:
a handle resolution manager configured to resolve the resource handle by:
determining the index; and
locating the resource pointer within the hierarchical structure of handle mapping tables based on the index.

48. The system as recited in claim 45, further comprising a handle deletion manager configured to delete a resource handle by deleting a resource pointer from a handle mapping table.

49. A computer implemented system comprising:
means for storing a hierarchical structure of handle mapping tables;
means for dynamically increasing the size of the hierarchical structure of handle mapping tables by adding a parent handle mapping table to existing child handle mapping tables;
means for storing a resource pointer at an indexed location in a lowest level handle mapping table;
means for creating a resource handle based on indices associated with indexed locations in one or more of the handle mapping tables; and
means for locating the resource pointer within the hierarchical structure of handle mapping tables without requiring mutually exclusive access to the handle mapping tables.

50. A computer implemented system comprising:
means for dynamically generating a hierarchical structure of handle mapping tables such that handle mapping tables at a lowest level of the hierarchical structure of handle mapping tables store resource pointers and handle mapping tables at higher levels of the hierarchical structure of handle mapping tables store pointer to the handle mapping tables at a next lower level of the hierarchical structure of handle mapping tables; and
means for generating resource handles based on index values that correspond to locations in handle mapping tables at one or more levels of the hierarchical structure of handle mapping tables.

51. The system as recited in claim 50 further comprising:
means for identifying a resource associated with a resource handle based on index values that are associated with the resource handle and that correspond to locations in handle mapping tables at one or more levels of the hierarchical structure of handle mapping tables.

52. One or more computer-readable media comprising computer executable instructions that, when executed, direct a computing system to:
maintain a hierarchical structure of handle mapping tables; and
dynamically increase a number of hierarchical levels associated with the hierarchical structure of handle mapping tables as requests for handles are received such that each higher level handle mapping table references one or more handle mapping tables in a next lower level of the hierarchical structure of handle mapping tables.

53. The one or more computer-readable media as recited in claim 52 further comprising computer executable instructions that, when executed, direct a computing system to:
store a resource pointer in a handle mapping table associated with a first level of the hierarchical structure of handle mapping tables;
determine a first index value associated with the resource pointer;
determine a second index value associated with a second level of the hierarchical structure of handle mapping tables; and
generate a resource handle based on the first and second indices.

54. The one or more computer-readable media as recited in claim 52 further comprising computer executable instructions that, when executed, direct a computing system to:
receive a resource handle;
determine first and second index values associated with the resource handle; and identify a resource associated with the resource handle based on a resource pointer stored at a location in a first handle mapping table, the location corresponding to the first index value.

55. The one or more computer-readable media as recited in claim 54 further comprising computer executable instructions that, when executed, direct a computing system to:
determine that a second handle mapping table associated with a second level of the hierarchical structure of handle mapping tables exists; and
select the first handle mapping table from multiple handle mapping tables associated with a first level of the hierarchical structure of handle mapping tables based on a pointer to the first handle mapping table stored in a location in the second handle mapping table, the location corresponding to the second index value.

56. One or more computer-readable media comprising computer executable instructions that, when executed, direct a computing system to:
receive a resource handle;
extract index values from the resource handle; and
locate a resource associated with the resource handle by traversing a hierarchical structure of handle mapping tables according to the index values such that mutually exclusive access to the tables is not required.

57. The one or more computer-readable media as recited in claim 56 further comprising computer executable instructions that, when executed, direct a computing system to:
extract the index values by parsing pre-determined bit values from the resource handle wherein the resource handle is a 32-bit integer.

58. The one or more computer-readable media as recited in claim 56 further comprising computer executable instructions that, when executed, direct a computing system to:
traverse the hierarchical structure of handle mapping tables based on:
a first index value that corresponds to a first handle mapping table location that stores a table pointer to a second handle mapping table; and
a second index value that corresponds to a location in the second handle mapping table that stores a resource pointer to a resource associated with the resource handle.

59. One or more computer-readable media comprising a dynamic hierarchical structure for representing resource handles, the structure comprising:
multiple first level handle mapping tables for storing resource pointers; and
one or more second level handle mapping tables for storing table pointers to the multiple first level handle mapping tables, such that a first level handle mapping table is created when a resource handle is requested and previously created first level handle mapping tables are full.

60. The one or more computer-readable media as recited in claim 59 wherein a second level handle mapping table is created when a first level handle mapping table is created and previously created second handle mapping tables are full.

* * * * *